US010613991B2

(12) United States Patent
Voigt et al.

(10) Patent No.: US 10,613,991 B2
(45) Date of Patent: Apr. 7, 2020

(54) TRANSPARENT ROUTERS TO PROVIDE SERVICES

(71) Applicant: Hewlett Packard Enterprise Development LP, Houston, TX (US)

(72) Inventors: Douglas L. Voigt, Boise, ID (US); Michael R. Krause, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 566 days.

(21) Appl. No.: 15/225,011

(22) Filed: Aug. 1, 2016

(65) Prior Publication Data
US 2018/0032444 A1     Feb. 1, 2018

(51) Int. Cl.
*G06F 12/1027*      (2016.01)
*G06F 12/02*        (2006.01)

(52) U.S. Cl.
CPC ...... *G06F 12/1027* (2013.01); *G06F 12/0246* (2013.01); *G06F 2212/1041* (2013.01); *G06F 2212/65* (2013.01); *G06F 2212/68* (2013.01); *G06F 2212/7201* (2013.01)

(58) Field of Classification Search
CPC .. G06F 12/1027; G06F 12/10; G06F 2212/65; G06F 2212/657; G06F 12/0246; G06F 2212/1041; G06F 212/68; G06F 2212/7201
USPC ......................................................... 709/221
See application file for complete search history.

(56) References Cited

U.S. PATENT DOCUMENTS

| 8,719,547 | B2 | 5/2014 | Chinya et al. |
| 8,789,170 | B2 | 7/2014 | Sastry et al. |
| 8,924,658 | B1* | 12/2014 | Bairavasundaram ........ G06F 3/0611 711/154 |
| 9,191,441 | B2 | 11/2015 | DeCusatis et al. |
| 9,762,537 | B1* | 9/2017 | Eyada ............. H04L 63/0227 |
| 2004/0030765 | A1* | 2/2004 | Zilbershtein ...... H04L 29/12481 709/223 |
| 2004/0030962 | A1* | 2/2004 | Swaine ................. G06F 11/25 714/45 |
| 2012/0260030 | A1* | 10/2012 | Karamcheti ......... G06F 9/5016 711/103 |
| 2013/0166762 | A1* | 6/2013 | Jalan ..................... H04L 61/00 709/228 |
| 2014/0025770 | A1* | 1/2014 | Warfield .......... G06F 15/17331 709/213 |

(Continued)

OTHER PUBLICATIONS

Voltaire® Storage Accelerator (VSA), (Web Page), Aug. 24, 2010, 4 pages.

*Primary Examiner* — Thomas J Dailey
*Assistant Examiner* — Lam H Duong
(74) *Attorney, Agent, or Firm* — Hewlett Packard Enterprise Patent Department (57) ABSTRACT

An example implementation in accordance with an aspect of the present disclosure includes an address translation table of a transparent router. In response to an add service request to add a service to at least a portion of a memory system, a first address to be affected by the service is identified. An affected entry of an address translation table of the transparent router is also identified. The affected entry corresponds to a data path including the first address. The affected entry is modified to cause its corresponding data path to point to a second address associated with the service.

15 Claims, 8 Drawing Sheets

(56) References Cited

U.S. PATENT DOCUMENTS

| | | |
|---|---|---|
| 2014/0258620 A1 | 9/2014 | Nagarajan et al. |
| 2015/0169231 A1 | 6/2015 | Kanigicherla et al. |
| 2015/0199126 A1* | 7/2015 | Jayasena ............... G11C 11/005 711/103 |
| 2015/0381493 A1* | 12/2015 | Bansal .................... H04L 45/30 370/392 |
| 2017/0244593 A1* | 8/2017 | Rangasamy ........ H04L 41/0654 |
| 2018/0262568 A1* | 9/2018 | Vaquero Gonzalez ...................... H04L 49/356 |

* cited by examiner

TRANSPARENT ROUTERS TO PROVIDE SERVICES

BACKGROUND

A system, such as a computer or other type of system, can include various types of devices and components, including processors, input/output devices, memory devices, and the like. The processor or I/O devices can issue memory access commands over a memory bus(es) to a memory device(s), based on a memory fabric(s). A memory fabric can interconnect memory devices with processors. Challenges in large memory system layout dynamics include encountering and handling changes to the memory system, such as those associated with component failure and repair, capacity expansion, load balancing, and the like.

DETAILED DESCRIPTION

Technology based on persistent memory, which does not lose its content when power is lost, is being integrated into compute and memory systems using memory fabrics. Large-scale persistent memory fabrics can experience some of the needs that might arise in a large storage-based system, due to the nature of persistent memory. Although persistent memory systems/fabrics can store data using non-volatile memory, such memory systems are accessed using memory protocols, unlike a storage system. For example, persistent memory systems can be integrated into a memory fabric that can include subnets, which imposes various constraints on the memory system to satisfy memory system architectures. Persistent memory fabrics can have various needs, including a need to respond to physical reconfiguration events such as those triggered by capacity expansion, load balancing, and/or field replicable unit (FRU) repair. Persistent memory fabrics can have a need to organize capacity in pools that are able to provide configurable services. Further, persistent memory fabrics can have a need to selectively include various types of services, such as those provided by hardware accelerators, in the path to memory. Accordingly, persistent memory systems are arranged to operate and deploy services substantially differently than merely a fast storage system (which might include various services that superficially appear similar to those offered by a persistent memory system).

Example memory systems/fabrics can be structured in such a way that memory address virtualization components (e.g., routers) within memory fabrics redirect memory accesses to services (e.g., alternative memory components or accelerators) that also exhibit memory-like behavior. Memory fabric virtualization enables the selective inclusion and exclusion of functionality/services/accelerators in the path through a memory fabric to a given memory component(s), thereby composing functionality related to data flow in the memory fabric by selectively redirecting data through services/accelerator components based on memory addresses. This is applicable to transparent services/functions, such as on-line data migration, data replication, data deduplication, data transformation, data versioning, content stream analysis, and so on. As set forth in greater detail below, example implementations can use memory addresses in the memory fabric to selectively include or exclude services/accelerators in memory access data paths. For example, the address translation table of a memory system router can be modified to direct memory requests in a specific memory range to a service/accelerator, thereby inserting that service/accelerator into one or more data flow(s). Such services/accelerator components present memory semantics as a universal system interconnect responder memory component, meaning that its insertion is transparent to the original requester, in the context of an example scalable, universal system interconnect intended to unify communications, simplify designs and solution architectures, and improve interoperability. Such a system can use a memory-semantic (Read-Write) protocol that enables multiple component types to efficiently communicate.

Memory fabrics can employ memory requests to communicate between components, such as a source node and a target node. For example, the source node can be a processor, while the target node can be a memory (volatile memory or non-volatile memory). A memory request can include a read request, a write request, an atomic operation request, or other type of request, which can be issued by the source node to access data in the target node. The target node responds to a memory request with a response (or multiple responses). Additionally, memory fabrics can employ service requests as described herein, to add or remove services from a given path between nodes in the memory fabric. A service request can include an address that is used to configure a transparent router to transparently remap the packet to a different target destination.

Nodes can include different types of electronic components, such as a graphics controller, an input/output (I/O) controller, a network interface controller, a computer, and so forth. More generally, a source node or target node can include an entire machine (e.g. a computer, storage system, communication system, a handheld device such as a smartphone or personal digital assistant, a game appliance, etc.), or alternatively, can include one of a combination of electronic components within a machine (e.g. a processor, a memory device, a persistent storage device, a graphics controller, an I/O controller, a network interface controller, etc.).

A memory environment can include multiple subnets. A subnet can refer to a logical subdivision of a larger network. Different subnets can employ separate address spaces. Each subnet can include a respective group of endpoint nodes. A transparent router can facilitate interoperability between multiple subnets, e.g., to support memory semantic operations between endpoint nodes located in different subnets, and is able to compose a view from any one subnet using memory or services that exist in other subnets. The transparent router also can facilitate interoperability between services located in the same subnet, e.g., a given node (requester) can take advantage of a given service located in the same subnet as the requester. Multiple subnets may be present in a network environment that includes fabric(s). Communications between endpoint nodes in different subnets can pass through the transparent router, which enables interconnection of multiple subnets. Such interconnections enable endpoint nodes in one subnet to not even be aware of endpoint nodes in another subnet.

An endpoint node can be referred to as being a "source node," and/or a "target node." A source node initiates a particular transaction with a request, and a target node responds to the request with a response. Note that for other transactions, the endpoint node can be a target node and/or a source node. A source node also can be referred to as a requester (e.g., a consumer of memory), and a target node also can be referred to as a responder (e.g., a provider of memory).

For a given transaction, the transparent router, which facilitates memory requests, can appear as a target node in a first subnet and as a source node in a second subnet. For a given transaction, the source node can submit a request to the transparent router as the target, while for the same given transaction, the transparent router is the source that submits the request to the target node. Thus, the transparent router can provide functionality that enables an endpoint node to behave as though communicating with a local subnet endpoint node, even though a transaction initiated by a source node involves endpoint nodes in multiple subnets. A subnet includes a communication fabric that allows endpoint nodes in the subnet to communicate with each other and with the transparent router. The communication fabrics of the subnets support memory semantic operations.

Basic configurations can enable virtualization, which takes place et the edges of the fabric in processors or memory field-replaceable units (FRUs) (i.e., processor-side virtualization). However, as such basic configurations are scaled up, the ability of such processor-side virtualization to address large scale memory management dynamics becomes hampered. For example, a given single processor is not in the path to all of the potential consumers of a memory FRU. This creates locking chatter between processors that share either data or capacity in affected FRUs. In the case of defragmentation in particular, most of the processors would be affected in this manner. Additionally, any changes to the virtual address maps of processors that share data or capacity in a memory FRU must be coordinated. Accordingly, if there are many such processors, the control plane overhead could reach unacceptable levels. An alternative to memory fabric scaling is network-based scaling, which is limited to message passing for small payloads and remote direct memory access for larger payloads. As a result, network-based scaling creates the potential for stranded capacity in memory fabric islands.

To address such issues, examples described herein may apply the router (TR) capability defined in the context of a universal system interconnect to hide coarse-grain memory system dynamics from processors and FRU's alike, enabling the ability to present stable virtual address spaces to processors despite memory layout/configuration changes. Example implementations can selectively include/remove services/accelerators in paths through the memory fabric, and control interference from the control plane during time-critical operations.

Figure 1A:
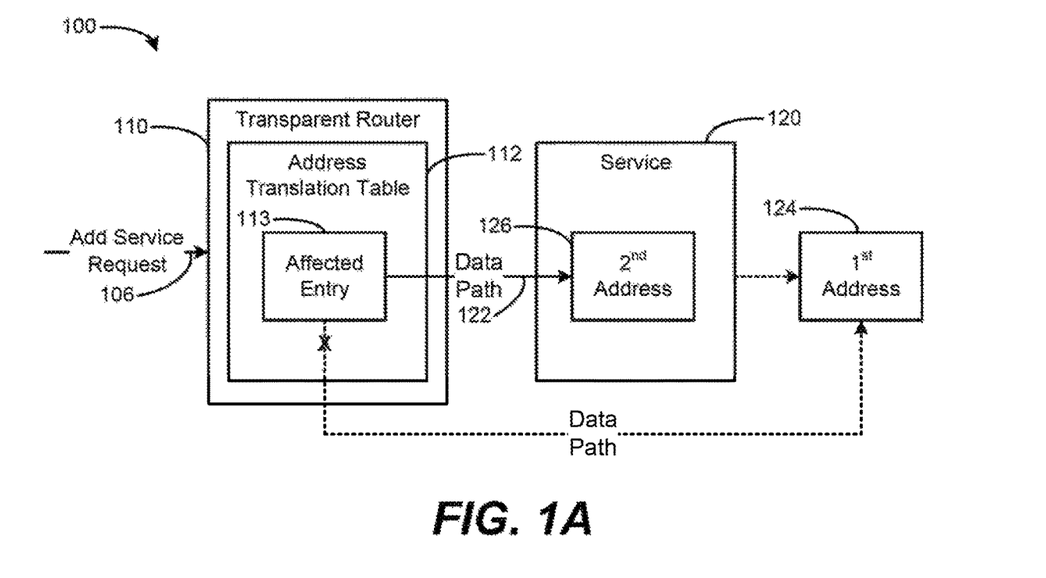
FIG. 1A is a block diagram of a system including a transparent router and an add service request according to an example.
Figure 1B:
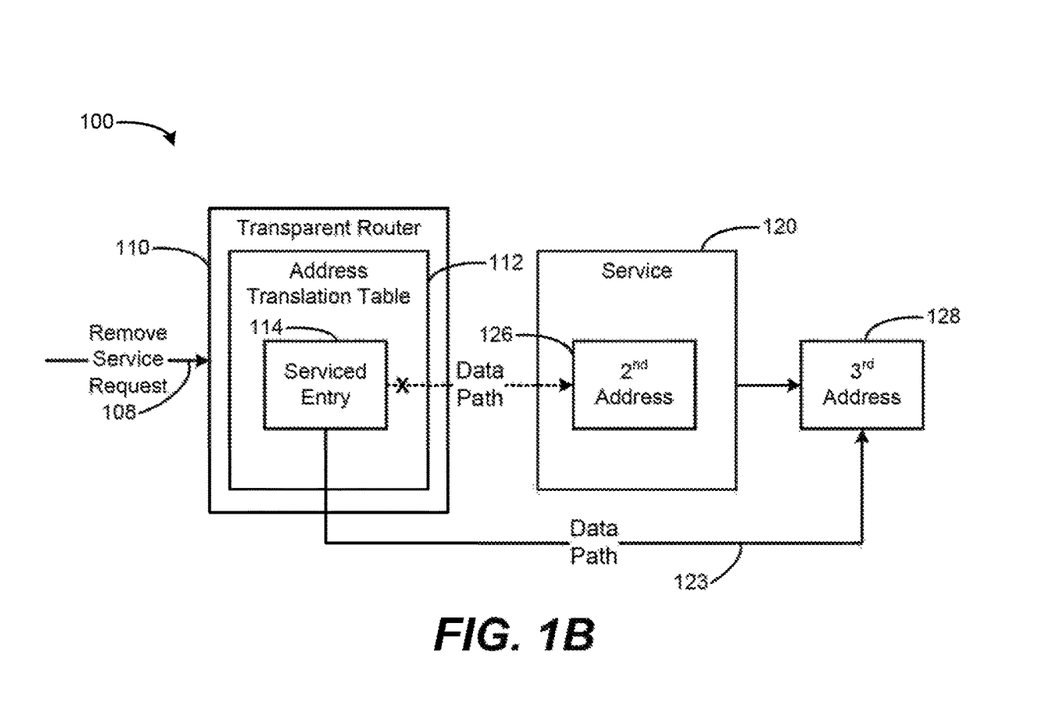
FIG. 1B is a block diagram of the system including the transparent router and a remove service request according to an example.

FIGS. 1A and 1B illustrate a block diagram of a system 100 including, a transparent router 110 receiving an add service request 106 (FIG. 1A), and receiving a remove service request 108 (FIG. 1B) according to an example. The transparent router 110 includes an address translation table 112, to selectively add or remove a service 120 to a data path 122 (e.g., to the first address 124 and/or the third address 128) based on affected entry 113 and serviced entry 114. The service 120 is associated with a second address 126.

As shown in FIG. 1A, in response to the add service request 106 to add the service 120 to at least a portion of a memory system, a first address 124 (which is to be affected by the service 120) can be identified by the system 100. A controller (not shown in FIGS. 1A, 1B; see FIG. 2), the transparent router 110, the service 120, or other components of the system 100 can perform the identifying, which can be based on information contained in the request (e.g., parsing a component identification portion of an address within a request that is contained in a packet received by the transparent router) and/or based on direction from the management plane (e.g., which can include the management plane interpreting system needs for a given service, and/or receiving user input to insert or remove a given service). An affected entry 113 of the address translation table 112 also can be identified. The affected entry 113 corresponds to the existing data path to be altered, which includes the first address 124. The system 100 modifies the affected entry 113 to cause its corresponding data path 122 to point to a second address 126, which is associated with the service 120. An add service request 106 can include/specify an address range that is to be affected by the service 120 to be added. The system 100 accordingly can modify a plurality of entries of the address translation table 112 within the address range, to cause their data paths to point to a corresponding second address(es) associated with a corresponding service(s).

As shown in FIG. 1B, the system 100 is to identify the second address 126 associated with the service 120 to be removed, in response to the remove service request 108 to remove the service from at least a portion of the memory system. A serviced entry 114 of the address translation table 114 is also identified. The serviced entry 114 corresponds to the existing data path which includes the second address 126 corresponding to the service 120. The system 100 identifies the third address 128 (which the service had been affecting), and modifies the serviced entry 114 to cause its corresponding data path 123 to point to the third address 128.

Example implementations described herein enable the system 100 to use an address, or address range, to provide a given function/service. For example, a given request 106 can be checked as to whether it is associated with a given address within a range, and corresponding service(s) can be implemented, and/or applied to that request. The transparent router 110 enables such requests to be formatted in a manner that is isolated from changes that might be applied to other parts of the memory system, such as by adding new services, replacing components, providing virtualization, and so on. For example, service requests can continue using a given address/address range to request a given service(s) when received at the transparent router 110, but a semantic overlaid on the transparent router 110 can be used to identify whether a certain address range (in which the given address/address range of the request falls) is being directed to a different type of service.

Thus, service requests can include an address that is used to transparently remap a given packet to a different target destination, corresponding to the service. Accordingly, service requests include information relevant to services, distinct from other requests such as read requests and write requests. Read, write, and other such requests can, e.g., specify an address to be written or read, in contrast to address(es) corresponding to a service(s). For service requests, the address can include, e.g., a component identification (CID), offset, and/or length, which can be used by, e.g., the transparent router 110 to identify which service(s) and how to apply them. Read, write, and similar requests may take various forms or be surrounded by various types of additional information. Add and remove service requests can be associated with management of a given system, in contrast to the memory access type of requests (e.g., read, write, etc.). The service requests can include parameters to identify translation table entries and/or services. In an example implementation, entries of the address translation table 113 can be identified using a ID of the transparent router 110 (to locate the transparent router 110 in the memory fabric), an address (to locate the starting entry in the address translation table 112), and a length (to specify how many additional entries to consider). Another example implementation for identifying an affected entry 113 of the address translation table 112 is by referring directly to an index (e.g. the i$^{th}$ entry) in the address translation table 112. The service 120 to be implemented can be identified with a CID corresponding to the service 120, or other definitive identifier of an instance of the service 120.

The request 106, 108 received at the transparent router 110 can be passed on to the service 120. However, the request passed to the service 120 may use a different encoding than the request received at the transparent router 110. For example, the transparent router 110 can modify the received request while still achieving the same result as desired from the requestor, and send the modified request onward. The transparent router could thus change the address, and send the request containing the changed address on to the service 120. Thus, the request can embody the execution of the original request, but may take on different forms.

A service/resource (or services/resources) can be associated with a target node in a memory system. A resource can include any or some combination of the following: a memory region of a memory device (or memory devices), a storage region of a persistent storage device (or storage devices), an electronic component or a portion of an electronic component (e.g. a processor, a switch, a programmable gate array (PGA), a digital signal processor (DSP), a general processing unit (GPU), etc.), an accelerator (which is an entity that is used to perform services/computations on behalf of another device), a shared I/O component (e.g., a network or storage controller, a graphics controller, etc.), an ingress or egress interface, and so forth. The transparent router 110 can use memory addresses in a memory fabric to selectively include or exclude such service(s), e.g., as provided by an accelerator(s) in the memory access path.

Figure 3:
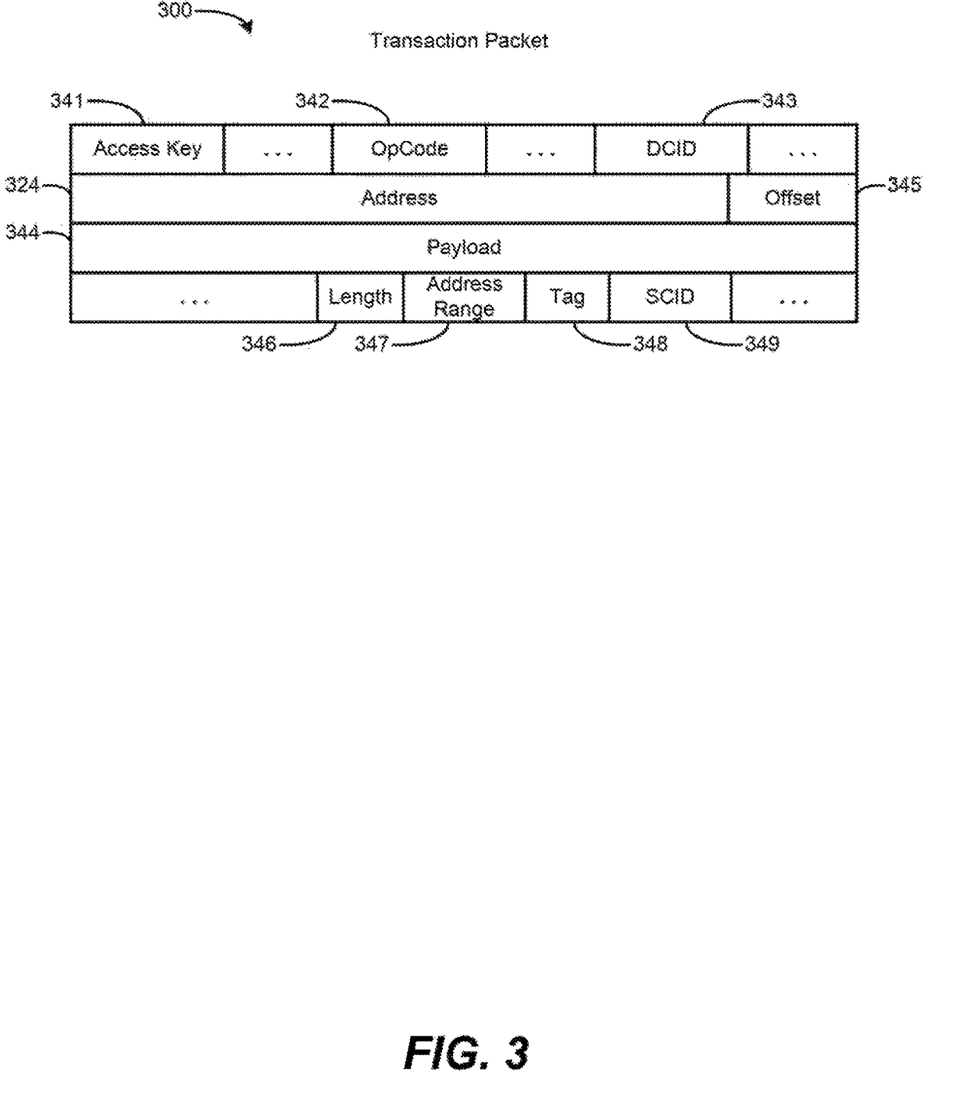
FIG. 3 is a block diagram of a transaction packet according to an example.

In example implementations, the transparent router 110 can process received packets/requests by translating fields of the received packets/requests. A request received from a source node can be referred to as a source node request, which is translated by the transparent router to a transparent router request. The transparent router can, in turn, send the transparent router request to a target node in response to the source node request. The example source node request includes a source component ID (SCID), a destination component ID (DCID), a memory address (e.g., the first address 124, although first, second, or third addresses could be used), and tag (the tag for the type of transaction initiated by the source node request in its subnet). For a read or write, the source address can be used to determine a relevant translation table entry. That entry contains one of the first, second, or third addresses, depending on whether services have been added or removed. FIG. 3 illustrates example fields in a transaction packet. After translation toy the transparent router 110, the source request becomes a transparent router request, which includes an SCID (which is the SCID of the transparent router 110), a DCID (which is the DCID of the target node, e.g., the service 120) a memory address (e.g., second address 126, although first, second, or third addresses could be used), and a tag (e.g., the tag for the transaction in its subnet, which may be the same subnet or a different subnet than the source node). In such a translation, addresses related to the service 120 can be translated.

Thus, memory addresses from requesters in one universal system interconnect subnet are looked up in an address translation table within the transparent router. The result is one or more alternative subnet, component, and address tuples which describe the memory request(s) that the transparent router 110 makes on behalf of the original requester.

To insert a service/accelerator into a data flow, the transparent routers address translation table 112 is modified to direct requests in a specific memory range to a service/accelerator component 120. The service tor component 120 can present the same memory semantics as any other universal system interconnect responder memory component, meaning that its insertion is transparent to the original requester. Once inserted, the service/accelerator 120 can perform its prescribed function, such as online data migration, data deduplication, data replication, data transformation, data versioning, content stream analysis, and so on. The use of memory addresses in a memory fabric to selectively include or exclude service/accelerators in memory access data paths is used to enable enhanced functionality for systems, without the difficulty of needing to reconfigure memory systems for each addition/removal of a given service/accelerator.

Figure 2:
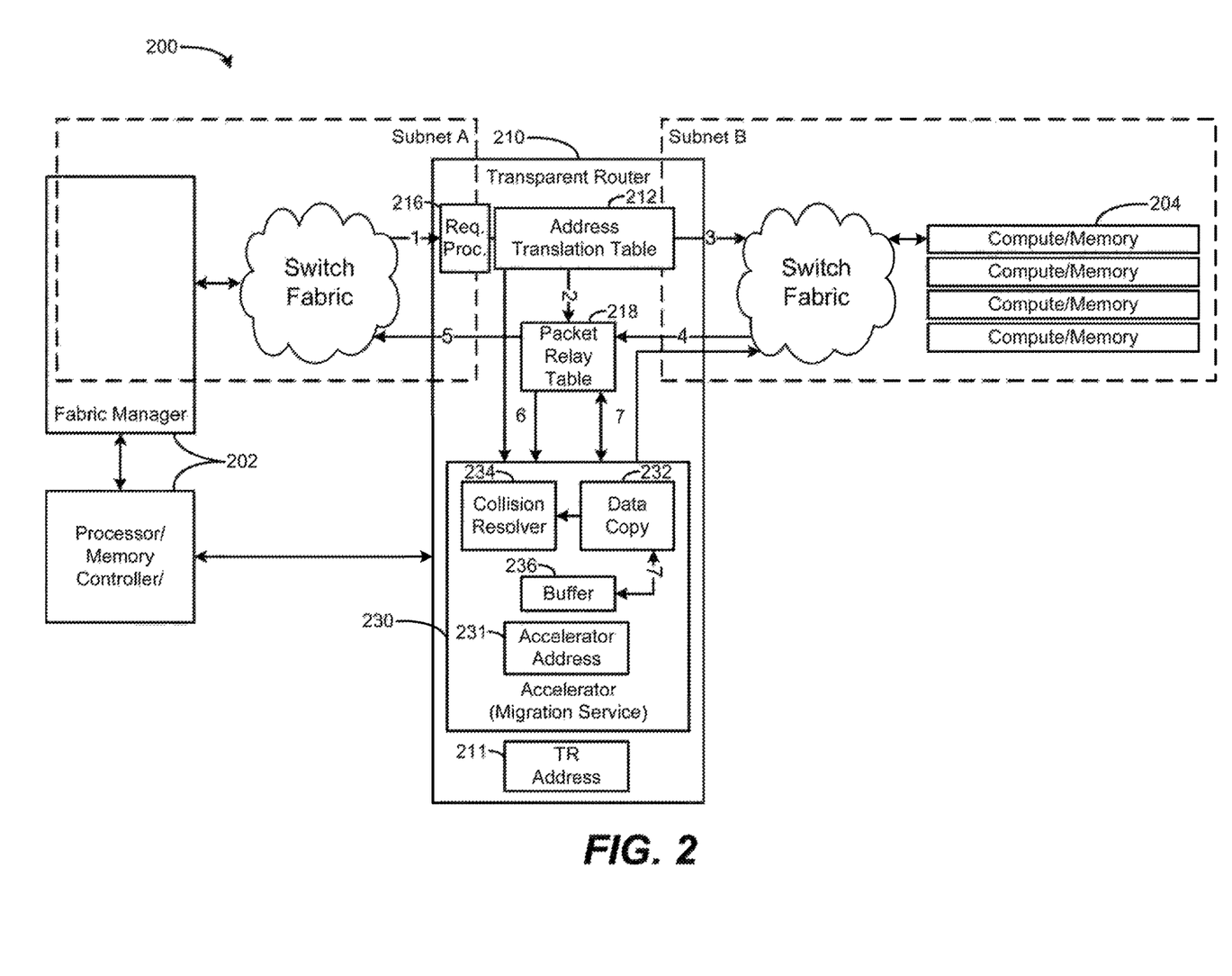
FIG. 2 is a block diagram of a system including a transparent router and an accelerator according to an example.

FIG. 2 is a block diagram of a system 200 including a transparent router 210 and an accelerator 230 according to an example. The transparent router 210 is associated with subnet A and its corresponding fabric manager/controller 202 and switch fabric. In an example implementation, the fabric management entity is distinct from the processor where applications execute that access the transparent router 210 to reach memory. FIG. 2 shows the fabric manager 202 as a discrete logic block associated with subnet A. However, in alternate examples, the fabric manager can communicate to the transparent router 210 from either subnet. The transparent router 210 also is associated with subnet B and its corresponding switch fabric and compute/memory 204. The transparent router 210 includes a request processing engine 216, an address translation table 212, a packet relay table 218, an accelerator 230, and a TR address 211. The accelerator 213 includes a collision resolver 234, data copy 232, buffer 236, and an accelerator address 231. The features of the accelerator 230 are distinct from the transparent router 210, and can provide adjunct functionality that works with transparent router management to deliver services. The accelerator features can therefore be hidden from subnet A and subnet B, or could be part of subnet B. For example, if most of the changes are made in subnet B, such as in the example of migrating data between subnet B memory tiers, then the accelerator engine that performs the migration needs to be able to issue requests to perform the actual migration, and then modify the TR translation tables once the migration is completed to point to the new resources.

The transparent router 210 is shown accompanied by an accelerator 230 to provide a migration service. As illustrated by arrows 1-7, the accelerator 230 is provided in the path from the processor/manager 202 to compute/memory 204. The function of the transparent router 210 is to connect multiple memory fabric subnets, and to provide requesters (processors 202) in a given subnet with a custom view of the responders (compute/memory 204) in other subnet(s) connected to the transparent router 210. One or more address translation tables 212 within the transparent router 210 are configured to present the desired memory fabric address view for each subnet. Many different types of services 230 can be provided, in addition to the illustrated memory migration accelerator service that is to migrate contents of a given address to another address.

The request processing engine 216 of the transparent router 210 is to receive an add service request, to add a service to at least a portion of a memory system. The request processing engine 216 can handle requests generated by a fabric manager 202 of a management plane. In response to the request, the transparent router 210 is to modify entries of the address translation table 212 to add or remove services from routing paths, based on instructions from the management plane. The request processing engine 216 can be provided as a request processing engine in the transparent router, to receive a request and use an offset in the request to perform one or more lookups in the address translation table 212. The result(s) of that lookup can be used by the request processing engine to route the result(s), e.g., onward to a memory component 204 and/or the corresponding accelerator 230. In alternate example implementations, the accelerator 230 is to generate an add service request and/or a remove service request, which can be processed similarly to those generated by the management plane as set forth above. Similarly, the transparent router 210 can provide such requests. A given service/accelerator 230 also can direct the transparent router 210 to modify the address translation table 212. Accordingly, the transparent router 210 has the flexibility to receive service requests from various sources, in order to implement desired services (which may be provided in a memory system, or provided by peer components that are not necessarily within the memory system). For example, a memory fabric uses addresses to communicate with peer components. Such peer components can provide any type of service. Accordingly, examples described herein can use semantic overlays to interpret the addresses and their applicability to a given service.

The accelerator 230 is shown as being resident at the transparent router 210, and is associated with an accelerator component address 231. Even though located co-resident, the accelerator address 231 can be different than the transparent router component address 211, to enable the two different components to be separately addressed. The transparent router 210 and the accelerator 230 can be co-packaged as shown, or can be provided separately.

The processor/memory controller/fabric manager 202 can be provided as a part of a memory system 200, e.g., as a server of a portion of another computing-capable system. The controller 202 can serve as a fabric manager that is to initiate services for the memory system 200. For example, the fabric manager 202 can interact with a management plane of the memory system 200, and include a controller to perform the functionality of identifying memory/components, and adding/removing services. The fabric manager 202 can run on a processor, a field-programmable gate array (FPGA), or other hardware/software to enable fabric manager functionality. The fabric manager 202 can interact with the various resources/components of the system 200, such as the transparent router 210, to selectively add and/or remove services and/or accelerators to paths to the compute/memory resources 204. For example, in response to completing a request for a given address and/or address range, the management plane (i.e., the fabric manager 202) can modify the address translation table 212 of the transparent router 210 to add or remove services as needed. The modification enables the transparent router 210 to refer to a given service(s), or remove a given service(s), from a given data path(s) specified in the address translation table 212. Similarly, a given service itself is capable of performing a modification of the address translation table 212, to add/remove itself and/or other services, without direct intervention by the fabric manager 202.

The accelerator 230 is to provide a migration service for illustrative purposes, and various other types of accelerators/services are available. The accelerator 230 is shown as being co-resident with the address translation table 212 in the transparent router 210. In alternate example implementations, the accelerator 230 can be located elsewhere in the system 200 relative to the transparent router 210, because the service(s) provided by accelerator(s) can be implemented along a path through the transparent router 210 which provides flexibility as to which subnet and/or memory fabric is to contain the accelerator 230. The accelerator/service 230 can be invoked transparent as to what data is flowing through the accelerator/service 230. A given accelerator/service 230 can be inserted or removed on different timescales. For example, some services 230 may be permanently inserted, and other services may be added or removed over time. One or more services 230 can be inserted and/or removed via interaction with the transparent router 210.

More specifically, insertion of the accelerator/service 230 will be described with reference to arrows 1-7. A universal system interconnect request, i.e., a read or write request, enters the transparent router 210 through a switch fabric in subnet A, as represented by arrow 1. The transparent router 210 uses the address translation table 212 to identify which exit port, memory component/FRU, and physical address will appear on subnet B to complete the request. The transparent router 210 records information in the packet relay table 218, as represented by arrow 2, to enable response routing. The transparent router 210 then forwards the request to the exit port, as represented by arrow 3. The packet relay table 218 is focused on how to relay packets, and generally is not used to comprehend a given request. When a memory component 204 returns a response (e.g., via a response packet), the response goes through the packet relay table as represented by arrow 4, to be routed back to the original requester as represented by arrow 5.

The transparent router 110 can maintain a table of requests in flight, e.g., using a tracking table entry in the packet relay table 218. The tracking table entry can include a pair of tags that identify request/response exchanges upstream and downstream from the transparent router 210. This allows the transparent router 210 to associate downstream activity, such as events, actions, data flows, acknowledgements, etc., with corresponding upstream activity, and vice versa. Being 'in flight' means that the transparent router 210 has received a request for an access, but the request has not yet been completed. The request, such as a read, write, or service request, can involve data that is in flight during steps indicated by arrows 1-5 as described above. Of note, regarding data in flight as indicated by arrow 2, is that the packet relay table 218 is to track requests in flight. Thus, when the request processing returns from the components 204 and the subnet B as indicated by arrow 4, the returning request can be immediately recognized and correlated with the requestor (e.g., a component in subnet A as indicated by arrow 5). This is because steps 1 and 5 are from the perspective of the requestor relative to the transparent router 210, and steps 3 and 4 are from the perspective of the responder relative to the transparent router 210 (in the illustrated example, the requester and responder are on different subnets, although other example implementations they can be on the same subnet). There will be potentially multiple requests at steps 3 and 4, which can have different addresses/address ranges from each other, as well as being different from items at steps 1 and 5. The packet relay table 218 can track such details, to enable happenings in subnet B to be correlated with the viewpoint of those corresponding components from subnet A.

When a service is applied, such as the beginning of a migration process provided by accelerator 230, an entry of the address translation table 212 is modified to reference the accompanying migration accelerator. This modification can be applied through the management plane by the fabric manager 202 as illustrated in FIG. 2, although in other example implementations the accelerator 230, the transparent router 210 itself, or other component of the memory system 200 can initiate the modification to the address translation table 212. While data corresponding to a given entry of the address translation table 212 is being acted upon by a service/accelerator (being migrated in the illustrated example), accesses to that data are routed through the accelerator 230 as indicated by the two arrows 6, so that the accelerator/service 230 can resolve collisions that might be generated by the service 230 (a migration process as illustrated in the accelerator 230 of FIG. 2). The two arrows 6 relate to routing reads and writes to the accelerator, and their respective tracking. For a given memory fabric address range referenced by the modified entry, the migration accelerator 230 reads data from a source computer/memory FRU 204 into a buffer 236 to minimize subsequent latencies, and begins writing the data to a new compute/memory FRU 204 in a predefined sequence, as indicated by the two arrows 7. The arrow to the right of 7 illustrates data read and write requests generated by the accelerator, and the arrow to the left of 7 illustrates the tracking of accelerator generated read and write packets. Thus, the components of the accelerator 230 are shown to provide an illustrative example for a migration service, and such components may not be needed by various other services/accelerators 230 not specifically illustrated in FIG. 2 (e.g., deduplication).

Requests can be in the form of, e.g., a transaction packet 300 as illustrated in FIG. 3, and can include read requests, write requests, add service requests, remove service requests, and so on. Such requests received at step 1 by the transparent router 210 include a destination component ID matching the TR address 211, directing that request to the transparent router 210 as the destination component in the memory system 200. That component ID specifically configured to refer to the transparent router 210. The address of the packet can include its own component ID in it, and an offset, which the transparent router 210 can use to traverse the address translation table 212 to find a corresponding entry at that offset. A request also can include a length, along with the component ID and offset. The length enables the request to act upon multiple entries of the address translation table 210. Packet formats that include a byte offset can be used to support small data deltas to locate an individual byte to start the operation. In summary, the transparent router 210 removes its own component ID from the packet/request, and uses the address to find an entry within the address translation table 212. The entry in the address translation table 212 specifies a new component ID and offset, for use in finding the corresponding service 230 and/or component 204. If the length of the request has an implicit range spanning multiple entries of the address translation table 212, the transparent router 210 can iterate multiple times to generate multiple actions in response to a request (e.g., forward multiple packets to the accelerator/service 230). As a memory fabric address range completes, the transparent router the process on the next entry until the servicing has completed. The size of the range of addresses being service can be aligned with/proportional to a resolution of the address translation table 212.

The address translation table 212 in the transparent router 210 can be provided by volatile memory in the transparent router 210. A persistent state of the address translation table 212 can thus be held within the management plane, e.g. in persistent storage at the fabric manager 202. The service/accelerator 230 can use persistent metadata in order to, e.g., resume a state of the service (e.g., migration) after a power loss or other interruption.

The transparent router 210 may interact with requesters so as to gracefully delay completion of requests that experience certain types of collisions, using features defined by a universal system interconnect specification. Thus, such delays/interactions can be performed efficiently and transparently to the requesters/applications, without a need for them to coordinate with and/or interrupt each other (which would incur significant performance overhead).

The fabric manager 202 and/or the transparent router 210 can locate an unused instance of an accelerator 230. The accelerator 230 can silently perform its service, such as by moving data from source to destination in the illustrated example of migration services), while the accelerator/service 230 keeps track of the serviced memory/components/data. Accordingly, the accelerator 230 can identify which portion of memory to access, based on whether the portion has been serviced or not, and where to locate the requested data (e.g., whether to use a memory in a location that has not yet been migrated, or post-migration, depending on how far along the migration service has proceeded and where an offset is located relative to how far along the migration has proceeded). Management interaction from the fabric manager 202 can configure the accelerator 230 and place it in a path by inserting the accelerator's address 231 in the corresponding path of the address translation table 212.

The controller/manager 202 can perform modifications to the address translation table 212 using out-of-band or in-band paths. An out-of-band path is using an interface other than a universal system interconnect through which requests are received to modify the address translation table 212. Example out-of-band paths include using Inter-Integrated Circuit (I2C, a component-level slower-speed interface used as a transport to deliver commands), and/or Ethernet (faster, and therefor of benefit for applications where faster speeds for dynamically modifying the address translation table are desirable). An in-band path uses a type of universal system interconnect request. Instead of, e.g., a read memory request or a write memory request, the in-band path request can be, e.g., a service request to modify the address translation table. Thus, the request can be formatted as a universal system interconnect request that is different than memory commands, e.g., originating from another party (such as the management plane) that is not the party performing reading/writing to/from memory, and thereby not needing to notify the reader or writer.

In example implementations, the transparent router 210 is able to support advanced transactions. As outlined briefly above one type of advanced request/transaction is a transaction in which the transparent router 210 transforms a single operation into multiple operations (e.g., multiple smaller operations). For example, a migration request to migrate data of a particular size is transformed into multiple smaller read/write requests associated with data of smaller sizes, which can be performed by multiple target nodes/accelerators in parallel to enhance parallelism. Such parallelism can be extended to operations performed by multiple different types of target nodes, and is not limited to performing the same type of service in parallel. Similarly, multiple services can be called in series. For example, in response to a given request, the transparent router 210 can respond to an advanced service request by sending a first request to a first accelerator to perform a first operation, whose resulting data can be sent from the first accelerator back to the transparent router 210. The transparent router 210 can then send a second request to a second accelerator, where the second request can include the resulting data from the first operation performed by the first accelerator.

The accelerator 230 can perform various services, such deduplication (to deduplicate data, in which identical copies of data are identified and only one of the identified identical copies is stored), malware detection (to detect malware, such as a virus, a worm, or any unauthorized code), data analysis (to perform analysis of data), an auditing service (to verify if a requester has permission to perform an operation, to create an audit trail, etc.), mathematical calculations (such as computing a running total or running average), or other computations.

FIG. 3 is a block diagram of a transaction packet 300 according to an example. A request, or a response to the request, can be communicated in a transaction packet through a communication fabric of a subnet. Thus, the transaction packet 300 can represent a service request as described herein. An example arrangement of fields that can be included in a transaction packet 300 are shown in FIG. 3. In other example implementations, other fields or other arrangements of fields can be included, in addition to and/or instead of the illustrated fields.

The transaction packet 300 includes multiple aspects. For example, in, universal system interconnect systems, the packet 300 includes an address 324, a component identification (ID) to identify a component in the memory, system (e.g., DCID 343), and a length 346, The system can apply the length 346 to the address 345, and check whether the result extends beyond a boundary between entries of an address translation table. The system then can determine whether to include a resulting service in the data path route to data separately for each entry over which the length extends. In some implementations, nodes on a communication fabric are uniquely identified using component identifiers (CIDs). Each node on the communication fabric is assigned one or multiple CIDs. In a given transaction, the source node is identified using a source CID (SCID), while the target node is identified using a destination CID (DCID). In other examples, the source node and the target node can be identified using other types of identifiers, such as IP addresses, TCP ports, and so forth. The transaction packet 300 can include an OpCode field 342, which contains an operation code. The payload field 344 can be used to carry a data payload when appropriate, such as write data for a write transaction. The tag field 348 can be used to store a tag identifier for associating a request with a response, such as a positive acknowledgement that the request was successfully completed. The tag can be used to correlate a request and a response to each other, by checking for corresponding matching tags. The combination of an SCID 349 and a tag 348 can be used to provide an identifier of a transaction. Within a given subnet, an outstanding request with a given [SCID, Tag] combination can be unique.

Figure 4:
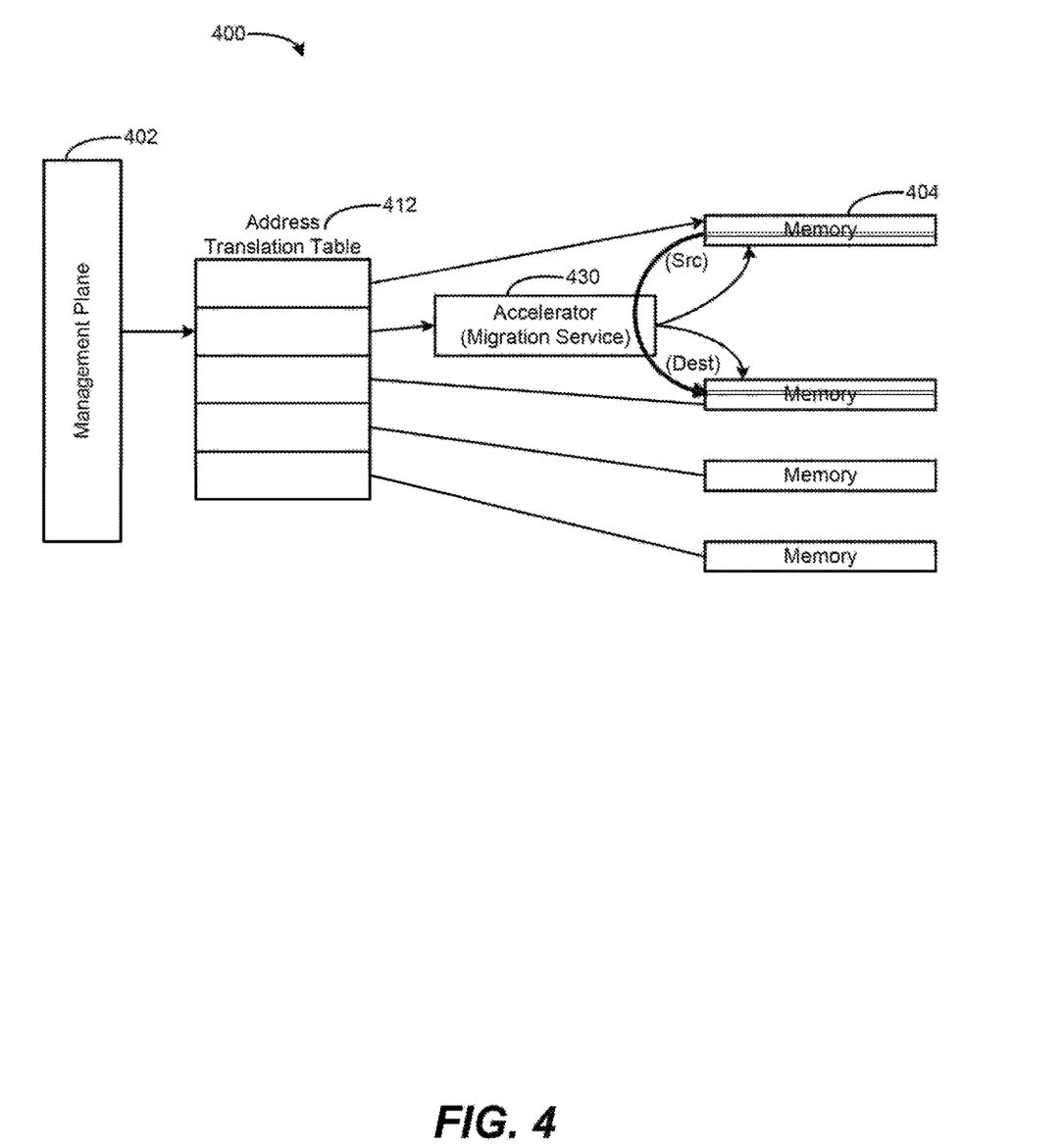
FIG. 4 is a block diagram of a system including an address translation table and an accelerator according to an example.

FIG. 4 is a block diagram of a system 400 including an address translation table 412 and an accelerator 430 according to an example. The management plane 402 is shown having modified the second entry of the address translation table 412 to point to the accelerator 430. Thus, the accelerator 430 (to provide a migration service) is shown inserted into the data path to a pair of memory components 404. The migration service accelerator 430 is shown operating on a small range of data in each of the two affected memory components 404, as illustrated by a small stripe being read from the upper memory component 404 and being written to the lower memory component 404. Other memory components (the two lower memory components 404) are shown as being accessed normally through the two neighboring entries in the address translation table 412 mapped to those memory components 404. In this illustrated example of migration service accelerator 430, data in the source memory component 404 (labeled Src in FIG. 4) is being migrated to the destination memory component 404 (labeled Dest). The migration is being performed by the accelerator 403 (as indicated the semicircular arrow) progressively from lowest physical address to highest. The stripe across the memory component 404 represents actively migrating data. In view of this approach to migration, the accelerator 430 treats the data below the stripe as valid at the destination (Dest), and treats data above the stripe as valid at the source (Src). Accordingly, the accelerator 430 can track the progression of the stripes and forward requests to the Src or Dest accordingly, in order to ensure that the valid data in either location is accessed.

The address translation table 412 of a transparent router may be modified (e.g., by the management plane) to cause the accelerator 430 to be in the path for the narrow stripe of the memory components 404 that is migrated from one location to another. Alternatively, the accelerator can track the location of the narrow stripe within the source or destination using its own metadata. When the service is complete, the address translation table 412 can be modified to refer to the data at its new location for the stripe that has been moved. The accelerator 430 can be sequenced to the next stripe/address range, to proceed servicing that range. Thus, through this iteration of migrating individual stripes and then modifying the address translation table 412 to sequence to the next stripe or range, the migration moves as a wavefront through the corresponding range of memory that is being migrated. The stripe can be provided as, e.g., a 4 kilobyte (KB) chunk of memory. When copying the stripe, the transparent router can be paused from accessing the old page, and updated so its address translation table 412 refers to a new page. Such pauses are minimal and do not impact performance notably, such that mappings can be manipulated on the fly to invoke services more easily. Such migration services can be used to defragment the mapping of virtual to physical addresses of data that is affected when adding persistent memory capacity to a computing system, to stay within practical virtual address management limits.

Figure 5:
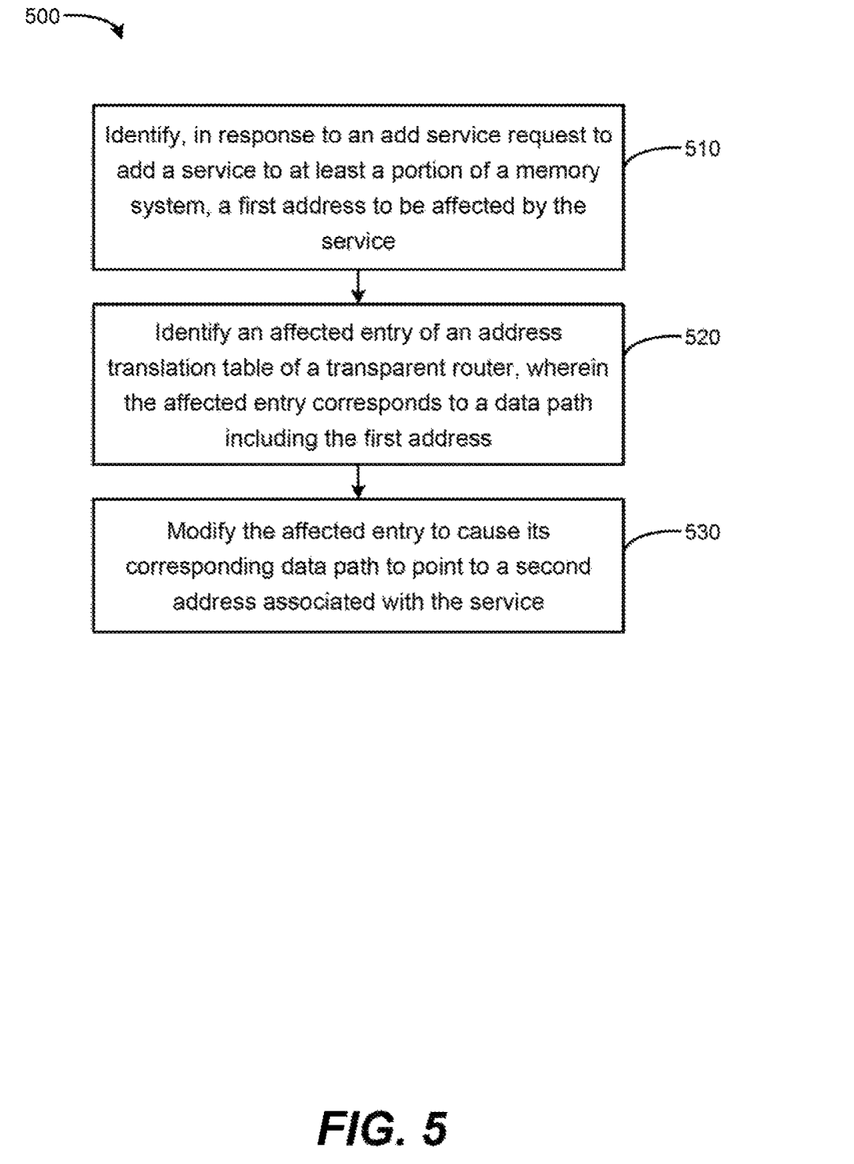
FIG. 5 is a flow chart based on modifying an address translation table in response to an add service request according to an example.
Figure 6:
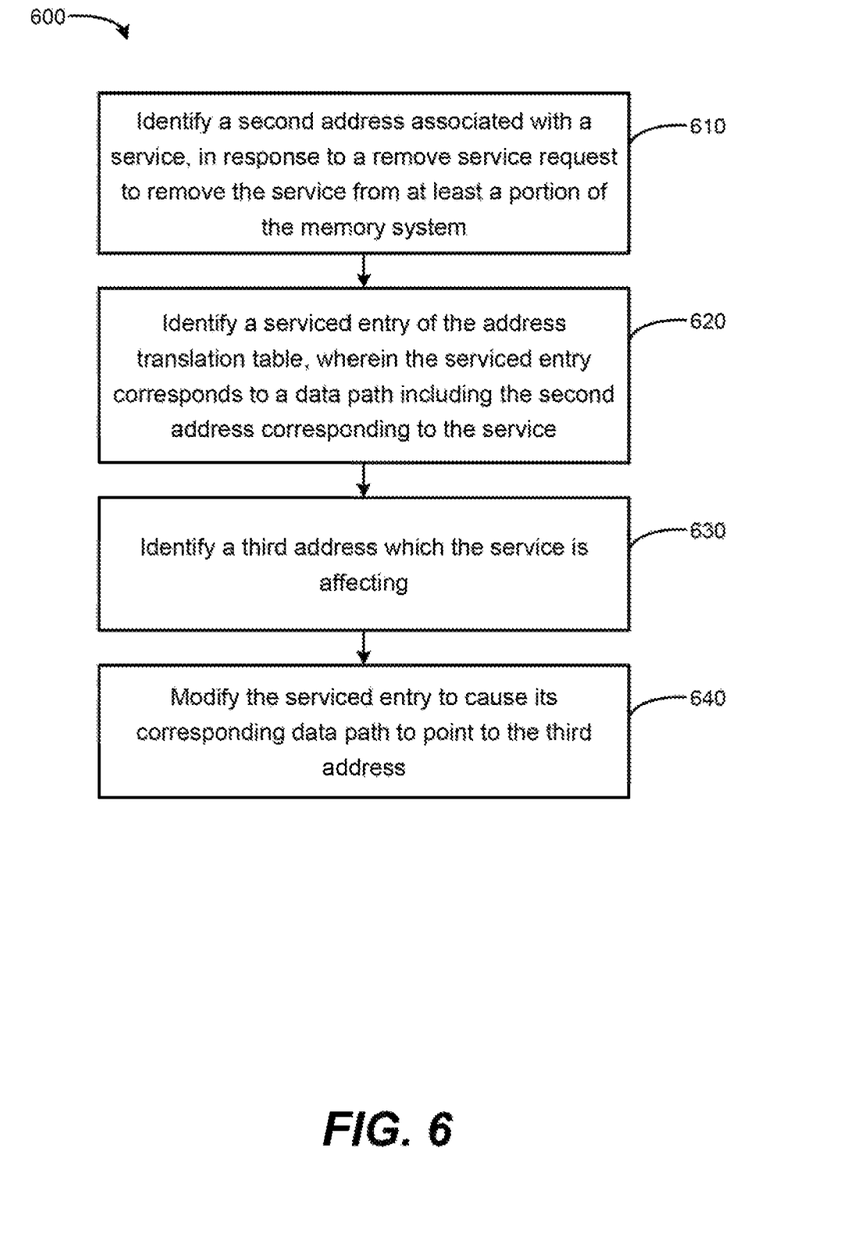
FIG. 6 is a flow chart based on modifying an address translation table in response to a remove service request according to an example.
Figure 7:
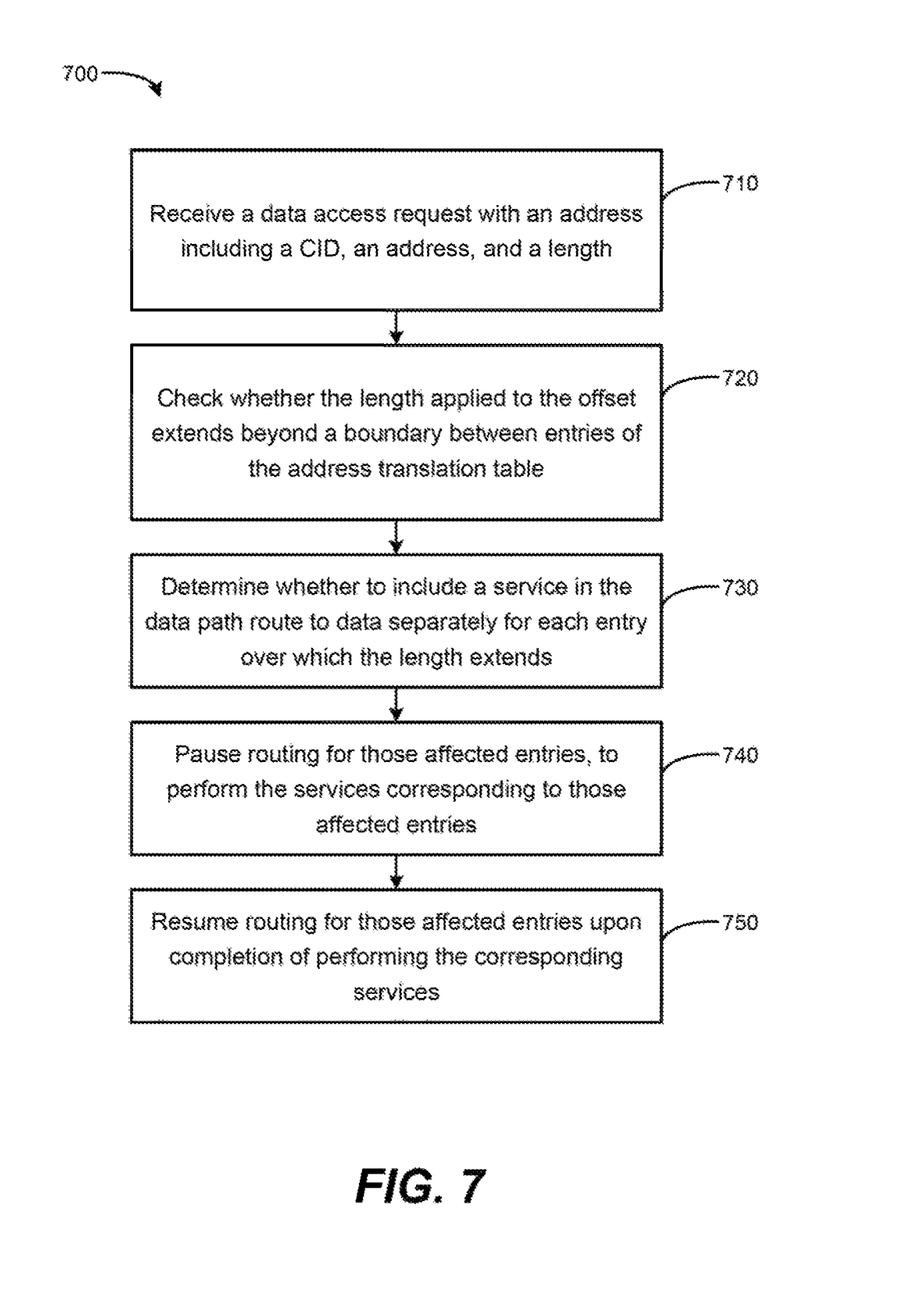
FIG. 7 is a flow chart based on receiving a data access request according to an example.

Referring to FIGS. 5-7, flow diagrams are illustrated in accordance with various examples of the present disclosure.

The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 5 is a flow chart 500 based on modifying an address translation table in response to an add service request according to an example. In block 510, in response to an add service request to add a service to at least a portion of a memory system, a first address to be affected by the service is identified. For example, the add service request can be in the form of a transaction packet received by a request processing engine of a transparent router. The request processing engine can identify that the first address is to be affected by a service based on looking up information from the transaction packet in an address translation table of the transparent router. In block 520, an affected entry of an address translation table of a transparent router is identified. The affected entry corresponds to a data path including the first address. For example, the request processing engine can use an address and/or a length from the transaction process, to access a corresponding entry or entries from the address translation table of the transparent router, which is associated with a data path including the first address. In block 530, the affected entry is modified to cause its corresponding data path to point to a second address associated with the service. For example, the request processing engine can store a new address in the corresponding entry/entries of the address translation table, to point to the destination address of a service/accelerator. In this manner, service can be added to a data path in a memory system.

FIG. 6 is a flow chart 600 based on modifying an address translation table in response to a remove service request according to an example. In block 610, a second address associated with a service is identified, in response to a remove service request to remove the service from at least a portion of the memory system. For example, a request processing engine can identify the second address within a field of the transaction packet sewing as the remove service request. In block 620, a serviced entry of the address translation table is identified. The serviced entry corresponds to a data path including the second address corresponding to the service. For example, the request processing engine can identify an address field in the transaction packet, and use the address value to access an entry/entries in the address translation table. In block 630, a third address which the service is affecting is identified. For example, an accelerator providing the service can track locations in memory that the accelerator is servicing, whose address/addresses can be shared with the request processing engine. In block 640, the serviced entry can be modified to cause its corresponding data path to point to the third address. For example, the request processing engine can update the entry/entries of the address translation table so that they point to those locations in memory that the accelerator has serviced. Thus, transactions will go directly to the locations in memory, bypassing the accelerator.

FIG. 7 is a flow chart 700 based on receiving a data access request according to an example. In block 710, a data access request with an address including a CID, an address, and a length is received. For example, a request processing engine of a transparent router receives a transaction packet including the address and related fields. In block 720, it is checked whether the length applied to the offset extends beyond a boundary between entries of the address translation table.

For example, the request processing engine can examine the transaction packet for the address and length fields, and index into an address translation table of the transparent router based on the address and length, to determine whether the indexing spans across multiple entries of the address translation table. In block 730, it is determined whether to include a service in the data path route to data separately for each entry over which the length extends. For example, the request processing engine can identify multiple entries in the address translation table based on the address and length within the transaction packet of an add service request, and modify those entries to point to the component ID of the accelerator providing the desired service. In block 740, routing is paused for those affected entries, to perform the services corresponding to those affected entries. For example, the request processing engine can delay processing further packets for the affected entries, until receiving an acknowledgement from the accelerator that it has completed providing service to the affected entries of the address translation table. In block 750, routing is resumed for those affected entries upon completion of performing the corresponding services. For example, the request processing engine can receive an acknowledgement packet from the accelerator after having provided services, and resume processing packets for those entries that were serviced.

Figure 8:
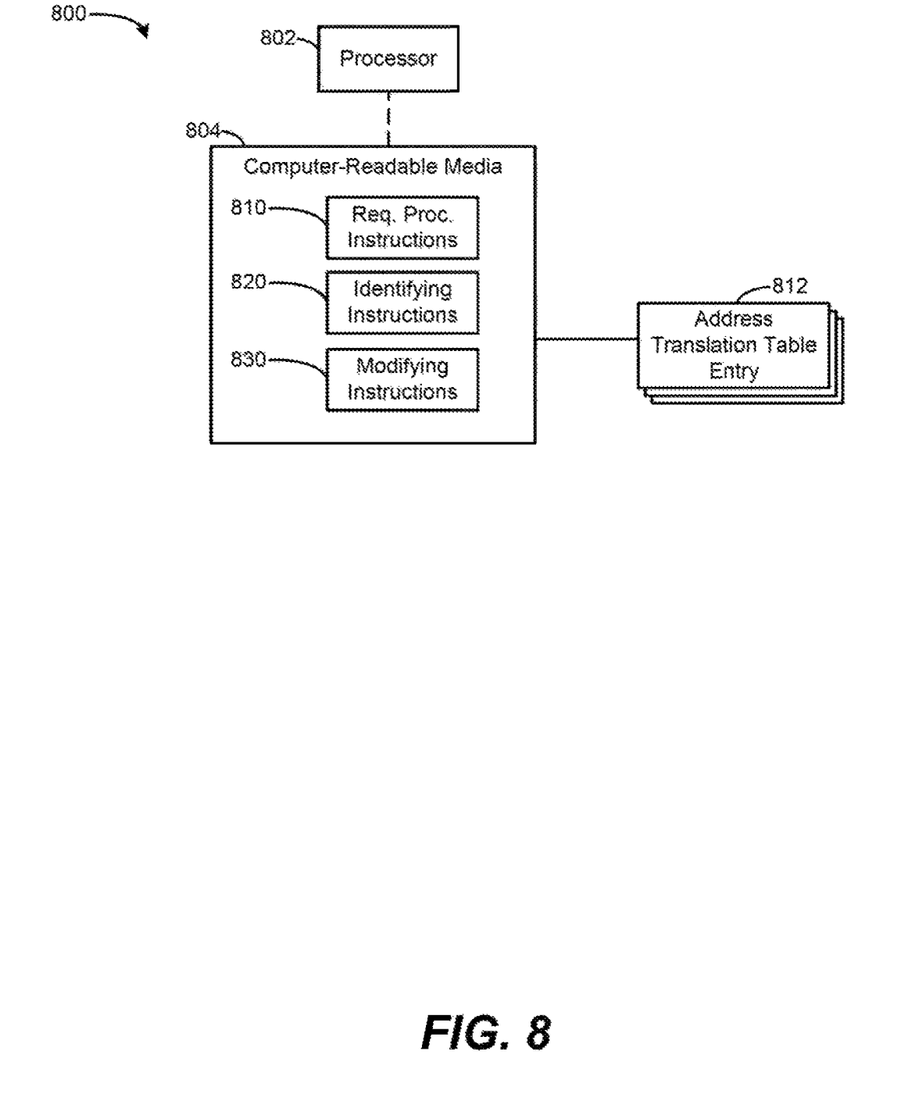
FIG. 8 is a block diagram of an exemplary system including computer readable media on which examples can be implemented.

FIG. 8 is a block diagram of an exemplary system 800 including computer-readable media 804 on which examples can be implemented. The computer-readable media 804 is coupled to a processor 802, and includes request processing instructions 810, identifying instructions 820, and modifying instructions 830. The computer-readable media 804 can interact with address translation table entries 812.

The example implementations provided herein may be implemented in hardware, software, or a combination of both. Example systems can include the processor 802 and memory resources for executing instructions stored in the tangible non-transitory medium 804 (e.g., volatile memory, non-volatile memory, and/or computer readable media). Non-transitory computer-readable medium 804 can be tangible and have computer-readable instructions stored thereon that are executable by the processor 802 to implement examples according to the present disclosure.

Example implementations (e.g., including a controller and/or processor of a computing device) can include and/or receive a tangible non-transitory computer-readable medium storing a set of computer-readable instructions (e.g., software, firmware, etc.) to execute the methods described above and below in the claims. For example, a system can execute instructions to direct a request processing engine (and/or a fabric manager engine, a service engine, and so on) to identify requests and modify address translation table entries, wherein the engine(s) include any combination of hardware and/or software to execute the instructions described herein. As used herein, the processor 802 can include one or a plurality of processors such as in a parallel processing system. The memory can include memory addressable by the processor for execution of computer readable instructions. The computer readable medium 804 can include volatile and/or non-volatile memory such as a random access memory (RAM), magnetic memory such as a hard disk, floppy disk, and/or tape memory, a solid state drive ("SSD"), flash memory, phase change memory, and so on.

As described herein, the term "engine" may include electronic circuitry for implementing instructions and/or functionality consistent with disclosed examples. For example, an engine represents combinations of hardware devices (e.g. processor and/or memory) and programming to implement the functionality consistent with disclosed methods/implementations. In examples, the programming for the engines may be processor-executable instructions stored on a non-transitory machine-readable storage media, and the hardware for the engines may include a processing resource to execute those instructions. An example system (e.g., a computing device), such as system 800, may include and/or receive the tangible non-transitory computer-readable media storing the set of computer-readable instructions. As used herein, the processor/processing resource may include one or a plurality of processors, such as in a parallel processing system to execute the processor-executable instructions. The memory can include memory addressable by the processor for execution of computer-readable instructions. The computer-readable media can include volatile and/or non-volatile memory such as a random access memory ("RAM"), magnetic memory such as a hard disk, floppy disk, and/or tape memory, a solid state drive ("SSD"), flash memory, phase change memory, and so on.

Accordingly, the request processing instructions 810 can be executed to process an add service request and/or a remove service request. In response to the processing, the identifying instructions 820 can be executed to identify, based on the requests, which addresses are affected by which services, in response to the identifying, the modifying instructions 830 can be executed to modify the corresponding address translation table entry/entries 812 of a transparent router, to thereby add and/or remove a corresponding service(s) to data paths of the transparent router.

What is claimed is:

1. A method comprising:
identifying, in response to an add service request to add a service to at least a portion of a memory system, a first address to be affected by the service;
identifying an affected entry of an address translation table of a transparent router, wherein the affected entry corresponds to a data path including the first address; and
modifying the affected entry to cause its corresponding data path to point to a second address associated with the service;
identifying the second address associated with the service, in response to a remove service request to remove the service at least a portion of the memory system;
identifying a serviced entry of the address translation table, wherein the serviced entry corresponds to a data path including the second address corresponding to the service;
identifying a third address which the service is affecting; and
modifying the serviced entry to cause its corresponding data path to point to the third address;
wherein the third address is different than the first address and is along the data path prior to the modifying of the service entry and following the modifying of the service entry.

2. The method of claim 1, wherein the service is provided by a memory migration accelerator, and wherein the memory migration accelerator is to migrate contents of the first address to the third address.

3. The method of claim 1, wherein a given address includes a component identification (ID) to identify a component in the memory system, and an offset to identify a location at the component.

4. The method of claim 3, wherein the given address further includes a length, the method further comprising:
receiving a data access request including the given address;
checking whether the length applied to the offset extends beyond a boundary between entries of the address translation table; and
determining whether to include the service in the data path route to data separately for each entry over which the length extends.

5. The method of claim 4, further comprising:
pausing routing for those affected entries, to perform the services corresponding to those affected entries; and
resuming routing for those affected entries upon completion of performing the corresponding services.

6. The method of claim 1, wherein the add service request includes an address range that is to be affected by the service, and wherein a plurality of entries of the address translation table within the address range are to be modified to cause their data paths to point to at least one second address associated with a corresponding at least one service.

7. The method of claim 1, further comprising an accelerator to provide the service, wherein the accelerator is resident at the router and associated with an accelerator component address that is different than the transparent router component address.

8. The method of claim 1, wherein the router is to interact with the service over at least one memory fabric, wherein the service is provided external to the router.

9. A transparent router comprising:
a request processing engine to receive an add service request to add a service to at least a portion of a memory system;
an address translation table including at least one entry, wherein an entry corresponds to a data path through a memory system, the data path including a first address; and
an accelerator to provide a service to the memory system, wherein the service is associated with a second address;
wherein the service provided by the accelerator is to be selectively included in the data path, based on identifying that the first address is to be affected by the service corresponding to the add service request, and modifying an affected entry of the address translation table associated with the first address, to cause the data path corresponding to the affected entry to point to the second address associated with the service;
wherein the service provided by the accelerator is to be removed from the data path in response to a remove service request, based on identifying the second address associated with the service, identifying a serviced entry of the address translation table corresponding to a data path including the second address for the service, identifying a third address which the service is affecting, and modifying the serviced entry to cause its corresponding data path to point to the third address;
wherein the third address is different than the first address and is along the data path prior to the modifying of the service entry and following the modifying of the service entry.

10. The transparent router of claim 9, wherein the accelerator is to generate at least one of i) the add service request, and ii) the remove service request, and wherein the service is to direct the transparent router to modify the address translation table accordingly.

11. The transparent router of claim 9, wherein the request processing engine is to handle requests from a fabric manager of a management plane, and wherein the transparent router is to modify entries of the address translation table to add or remove services from routing paths based on instructions from the management plane.

12. A fabric manager to interact with a management plane of a memory system, the fabric manager comprising:
a controller to:
identify a first address to be affected by a service corresponding to an add service request to add the service to at least a portion of a memory system;
identify an affected entry of an address translation table of a transparent router, wherein the affected entry corresponds to a data path including the first address; and
modify the affected entry to cause its corresponding data path to point to a second address associated with the service;
identify the second address associated with the service, in response to a remove service request to remove the service from at least a portion of the memory system;
identify a serviced entry of the address translation table, wherein the serviced entry corresponds to a data path including the second address corresponding to the service;
identify a third address which the service is affecting; and
modify the serviced entry to cause its corresponding data path to point to the third address;
wherein the third address is different than the first address and is along the data path prior to the modifying of the service entry and following the modifying of the service entry.

13. The method of claim 1, wherein the data path corresponding to the affected entry includes both the first address and the second address following the modifying of the affected entry, the method further comprising routing the data along the data path to and between the first address and the second address.

14. The transparent router of claim 9, wherein the data path corresponding to the affected entry includes both the first address and the second address following the modifying of the affected entry, the method further comprising routing the data along the data path to and between the first address and the second address.

15. The fabric manager of claim 12, wherein the data path corresponding to the affected entry includes both the first address and the second address following the modifying of the affected entry, the method further comprising routing the data along the data path to and between the first address and the second address.

* * * * *